(12) United States Patent
Lee

(10) Patent No.: US 11,281,413 B2
(45) Date of Patent: Mar. 22, 2022

(54) PERFORMING PRINT JOB ACCORDING TO FORMAT OF PRINT JOB ACQUIRED BASED ON METADATA

(71) Applicant: Hewlett-Packard Development Company, L.P., Spring, TX (US)

(72) Inventor: Yoon Soo Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/050,891

(22) PCT Filed: Dec. 31, 2018

(86) PCT No.: PCT/KR2018/016957
§ 371 (c)(1),
(2) Date: Oct. 27, 2020

(87) PCT Pub. No.: WO2020/040366
PCT Pub. Date: Feb. 27, 2020

(65) Prior Publication Data
US 2021/0232353 A1    Jul. 29, 2021

(30) Foreign Application Priority Data

Aug. 23, 2018 (KR) .......................... 10-2018-0098851

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC .......... *G06F 3/1253* (2013.01); *G06F 3/1206* (2013.01); *G06F 3/128* (2013.01); *G06F 3/1287* (2013.01); *G06F 3/1288* (2013.01); *G06F 3/1292* (2013.01); *G06F 3/1293* (2013.01); *H04N 1/00973* (2013.01)

(58) Field of Classification Search
CPC ...... G06F 3/1253; G06F 3/1206; G06F 3/128; G06F 3/1287; G06F 3/1288; G06F 3/1292; G06F 3/1293; H04N 1/00973
USPC ............................. 358/1.15, 1.14, 1.13, 1.1
See application file for complete search history.

(56) References Cited

U.S. PATENT DOCUMENTS

| | | | |
|---|---|---|---|
| 2004/0143566 A1* | 7/2004 | Fukasawa | ............... G06F 16/93 |
| 2004/0227968 A1 | 11/2004 | Nakamura et al. | |
| 2007/0187493 A1 | 8/2007 | Hong et al. | |

(Continued)

FOREIGN PATENT DOCUMENTS

| | | |
|---|---|---|
| JP | 2013-192150 A | 9/2013 |
| JP | 2014-120899 A | 6/2014 |

(Continued)

*Primary Examiner* — Douglas Q Tran
(74) *Attorney, Agent, or Firm* — Jefferson IP Law, LLP

(57) ABSTRACT

A user device generates metadata including location information of a print job target, based on a user input made via a user interface device, and transmits the generated metadata to an image forming apparatus. The image forming apparatus analyzes the metadata received from the user device via a communicator, obtains a print job target from a server storing the print job target, based on location information of the print job target included in the metadata, and performs a printing job according to a format of the obtained print job target.

12 Claims, 11 Drawing Sheets

(56) References Cited

U.S. PATENT DOCUMENTS

| | | | |
|---|---|---|---|
| 2011/0109934 A1* | 5/2011 | Lee | G06F 3/1237 |
| | | | 358/1.15 |
| 2011/0292425 A1 | 12/2011 | Lee | |
| 2012/0274979 A1 | 11/2012 | Uchida | |
| 2013/0229694 A1 | 9/2013 | Tonegawa | |
| 2019/0037037 A1* | 1/2019 | Umeya | G06F 21/121 |
| 2020/0258079 A1* | 8/2020 | Kim | G06Q 20/065 |

FOREIGN PATENT DOCUMENTS

| | | |
|---|---|---|
| JP | 2014-232984 A | 12/2014 |
| JP | 2017-063498 A | 3/2017 |
| KR | 10-2011-0023075 A | 3/2011 |

* cited by examiner

[Fig. 1]
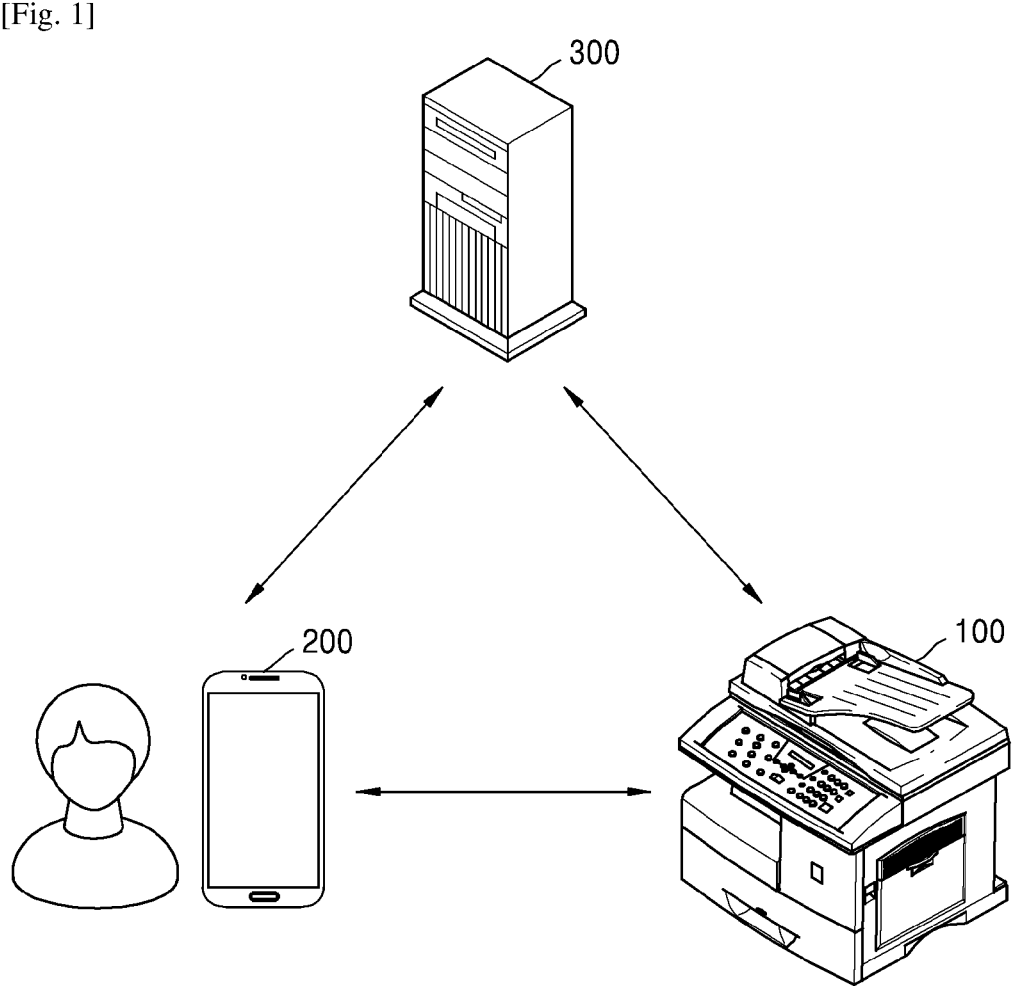

[Fig. 2]
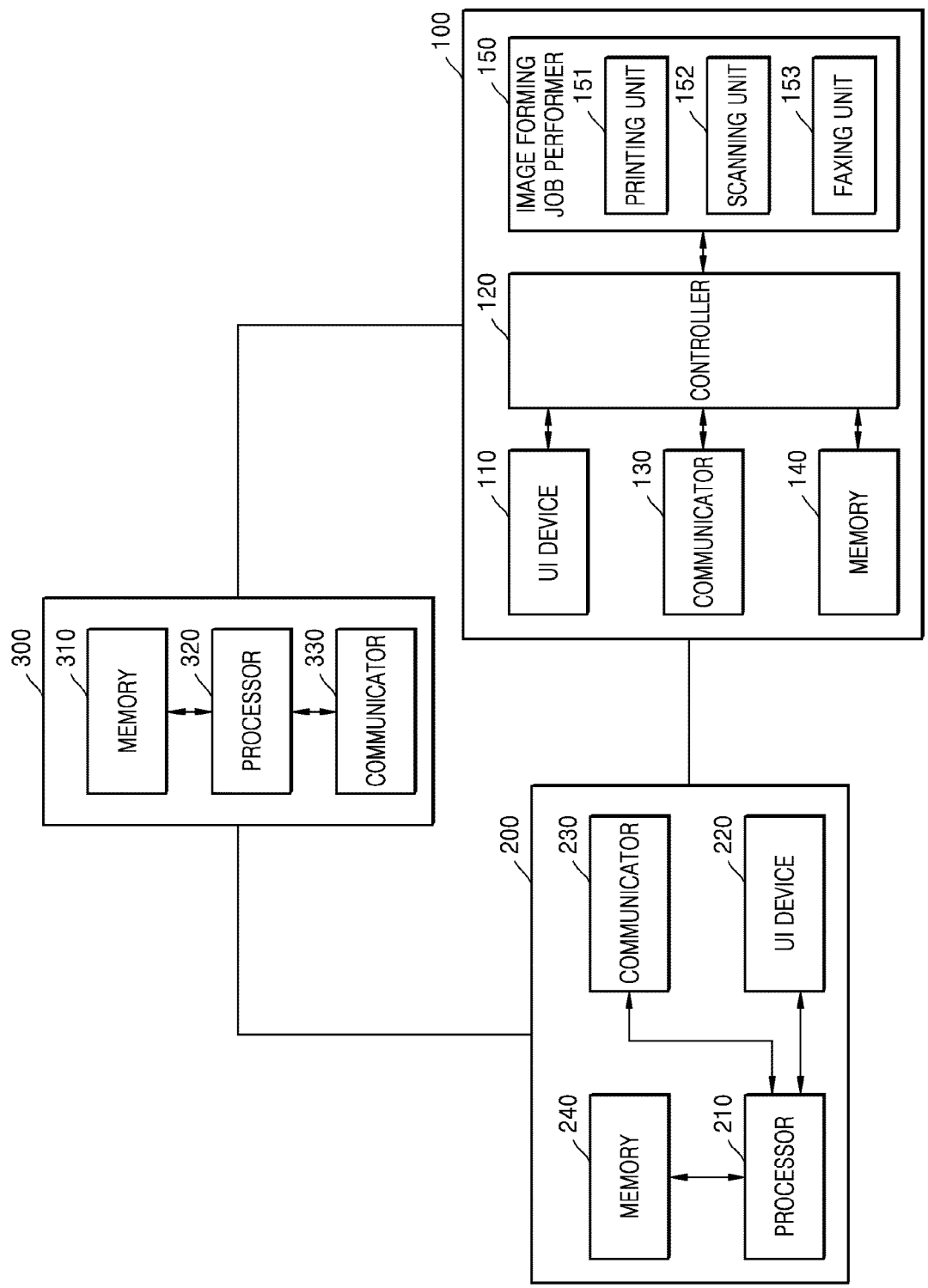

[Fig. 3]
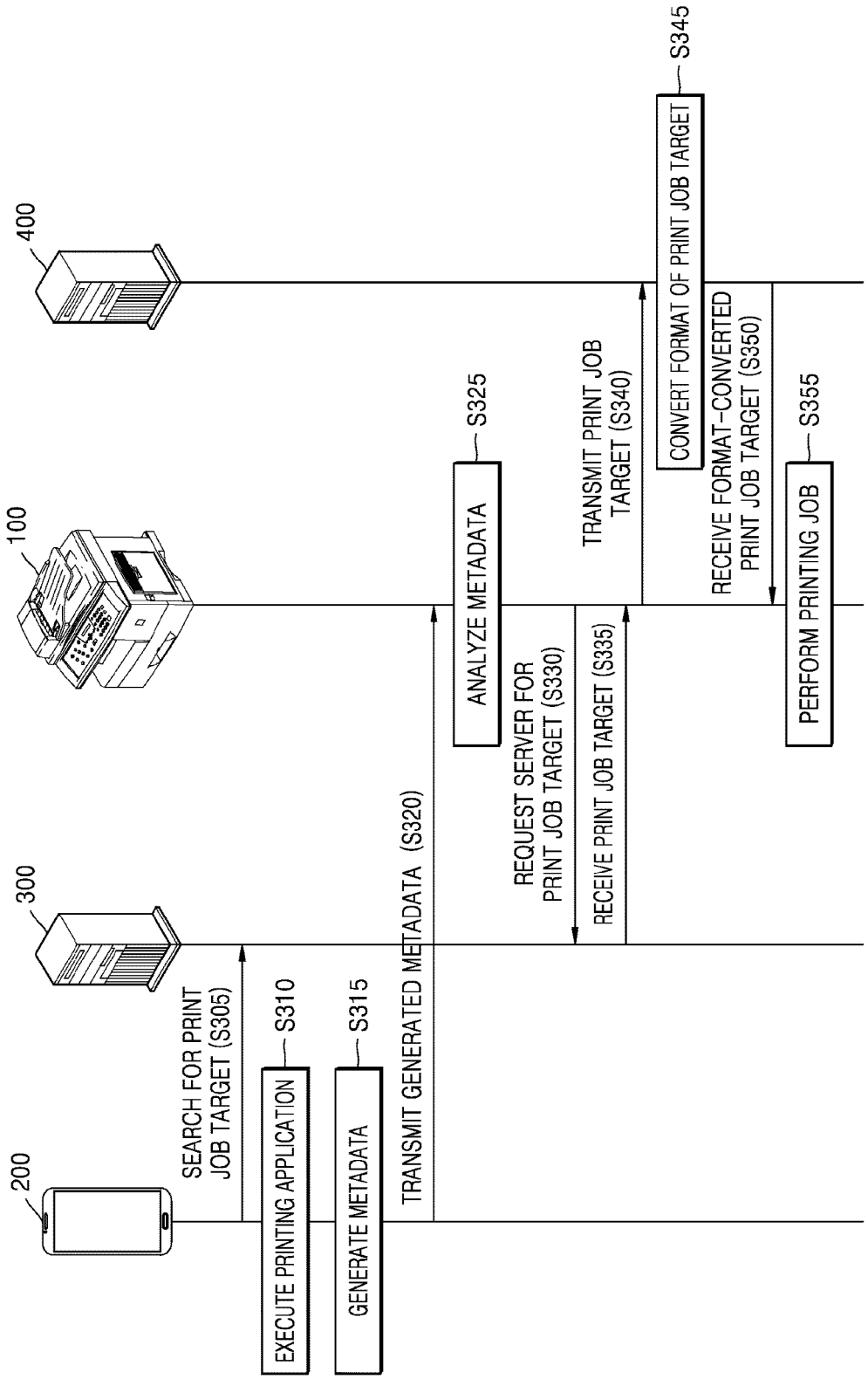

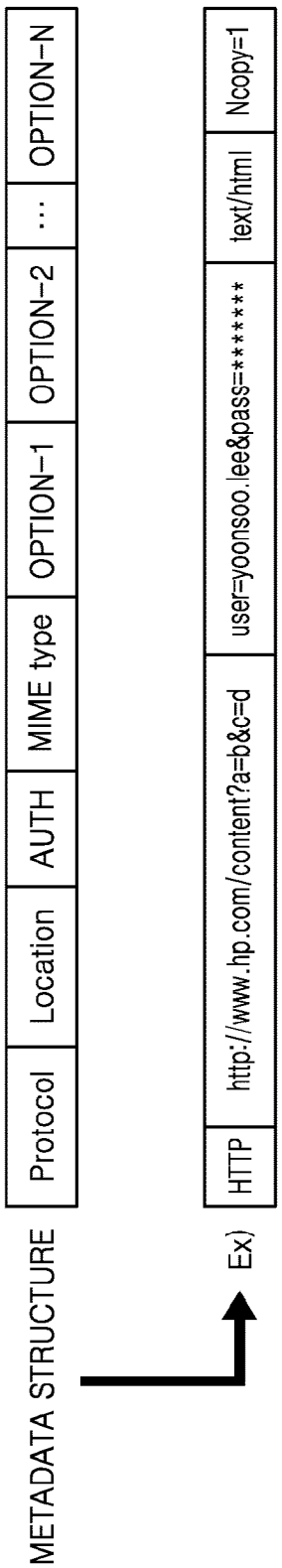
[Fig. 4]

[Fig. 5]
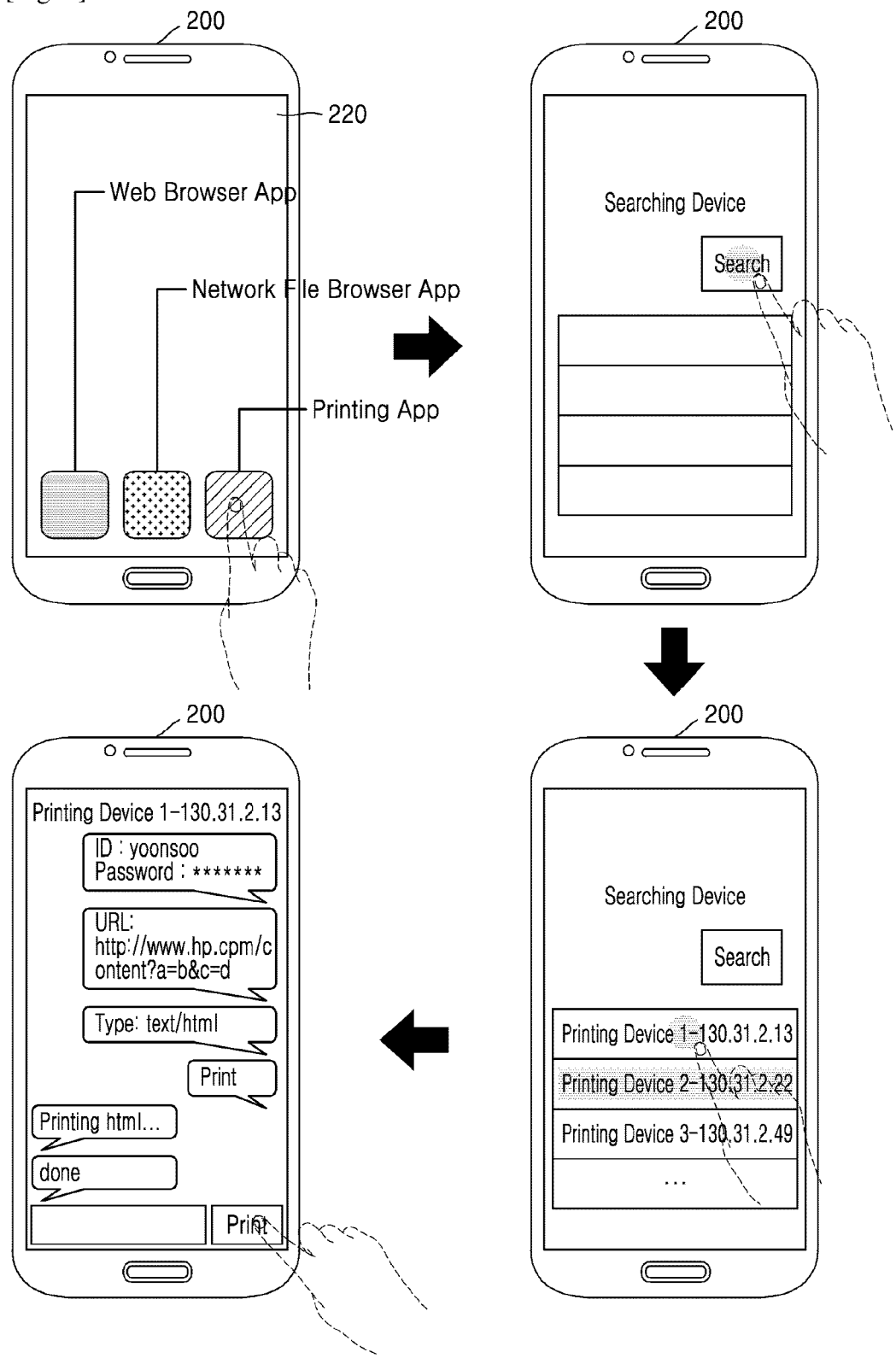

[Fig. 6]
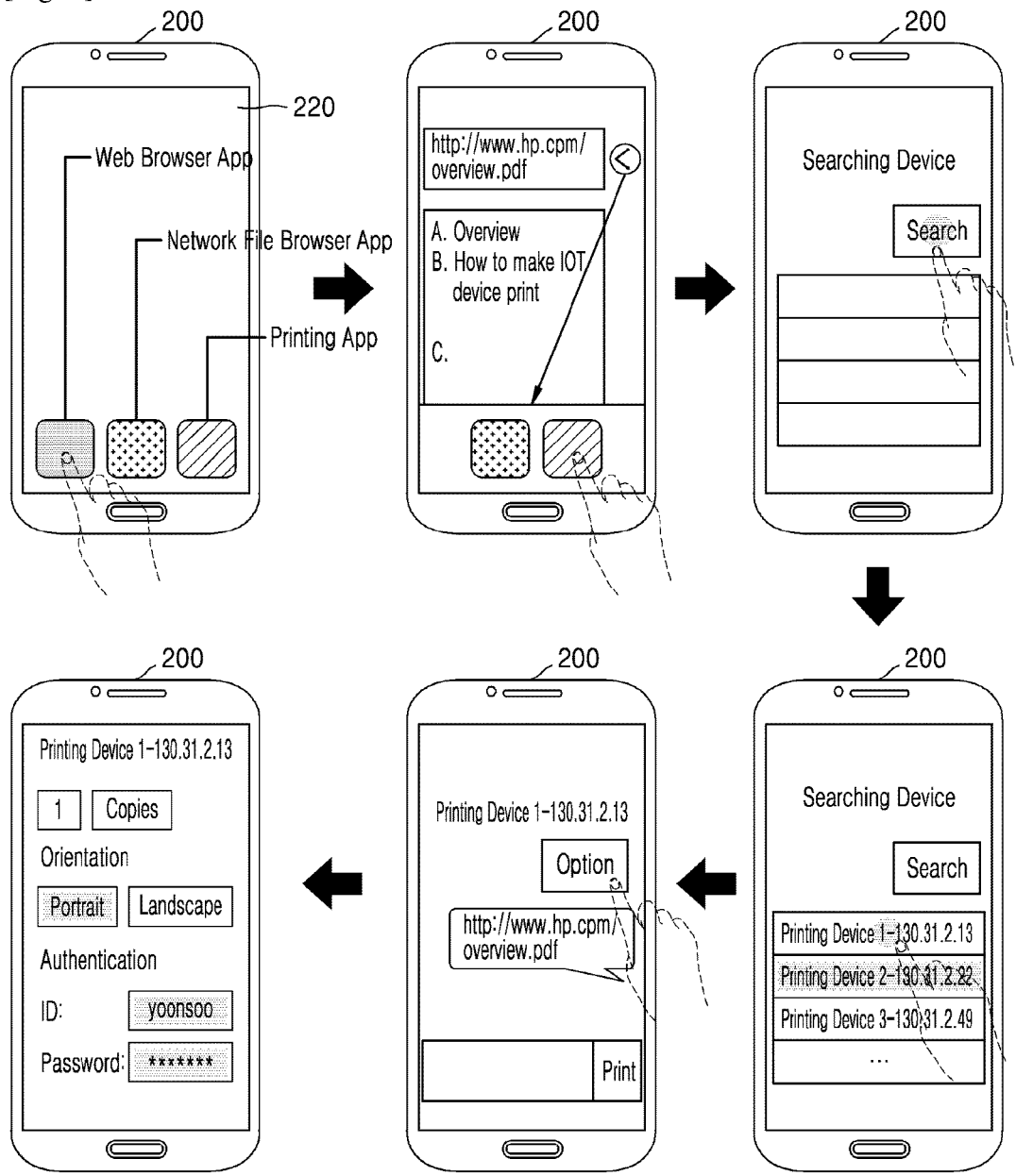

[Fig. 7]
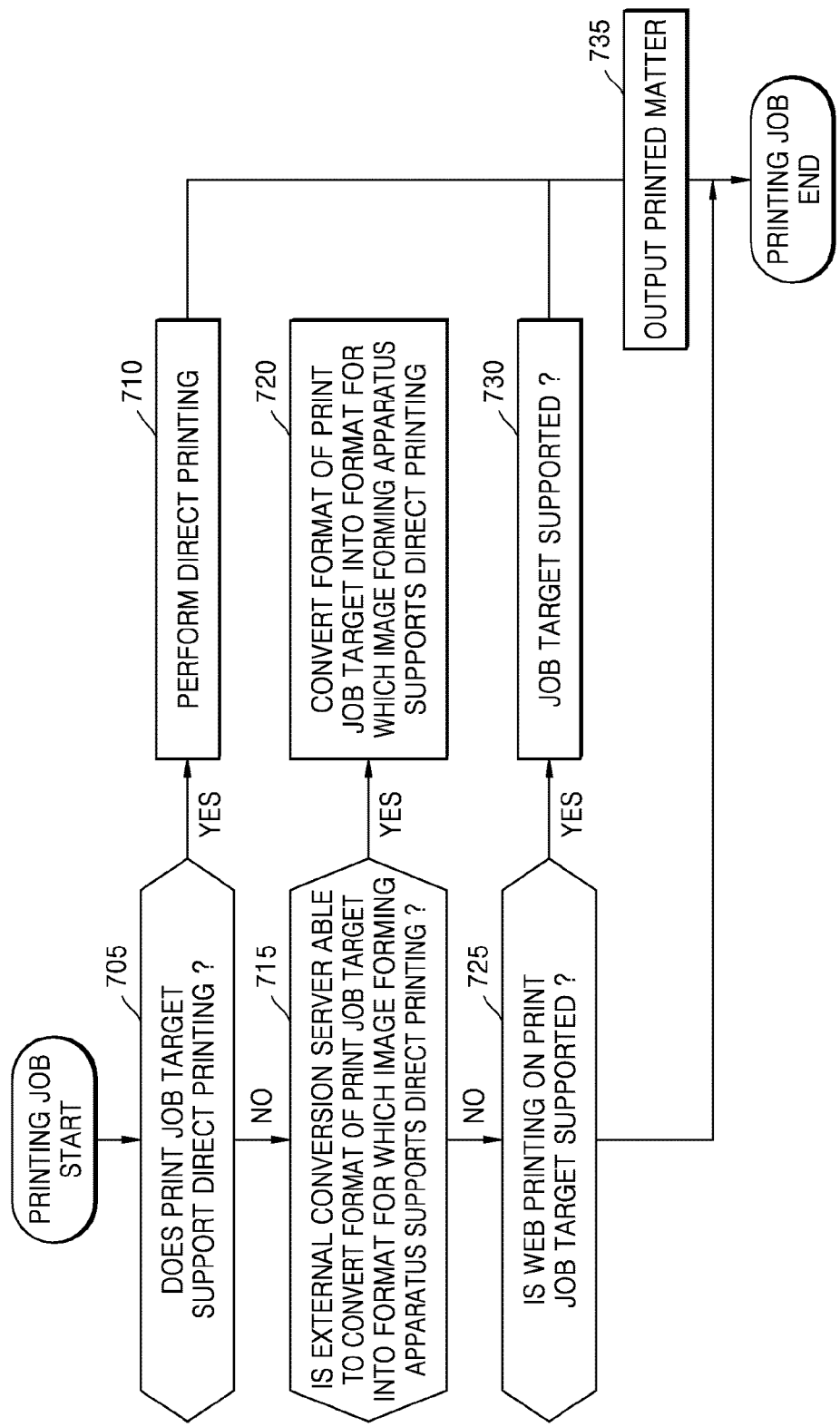

[Fig. 8A]
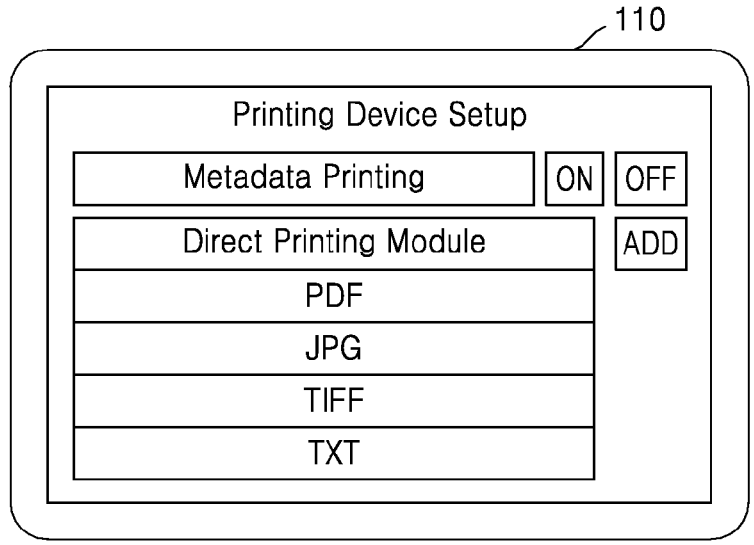
[Fig. 8B]
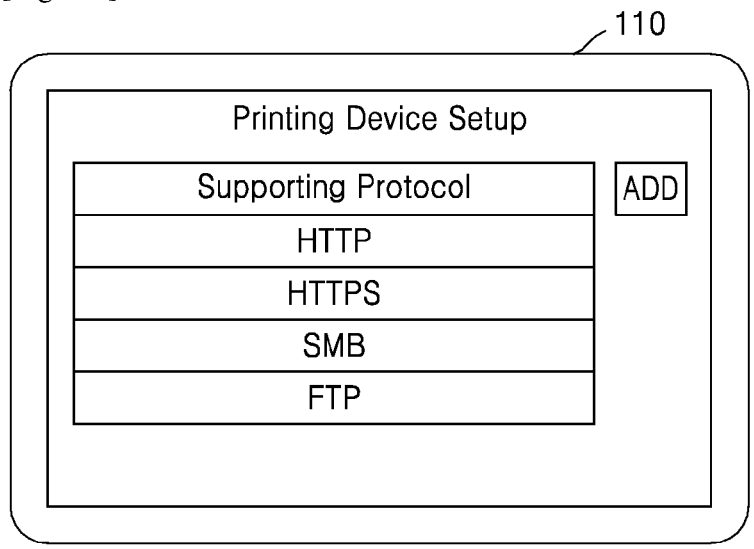
[Fig. 8C]
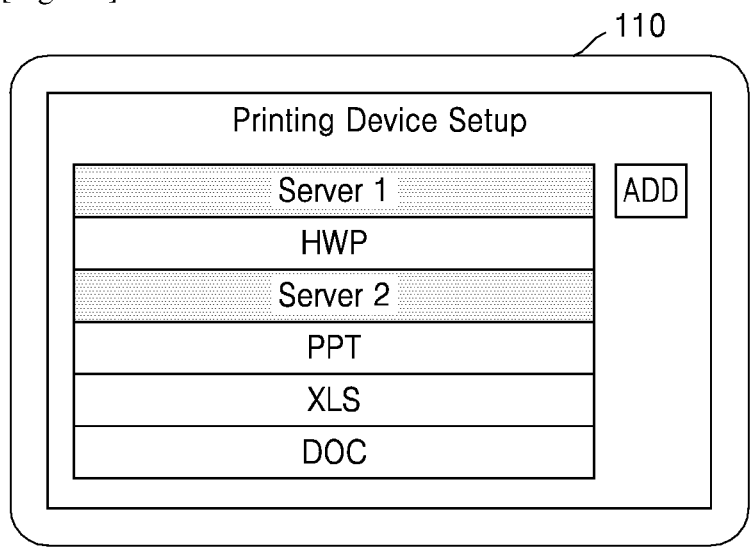

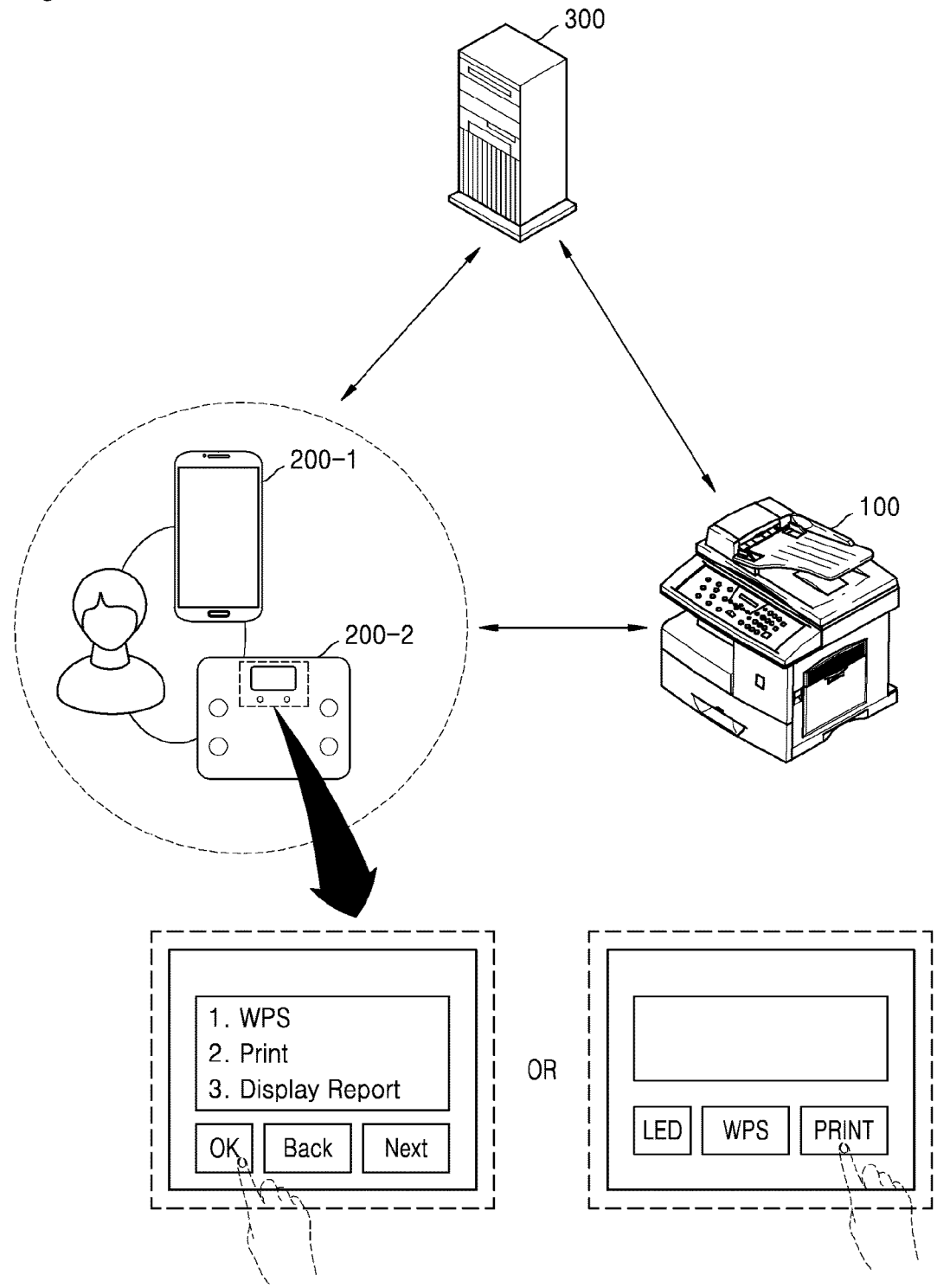
[Fig. 9]

[Fig. 10]
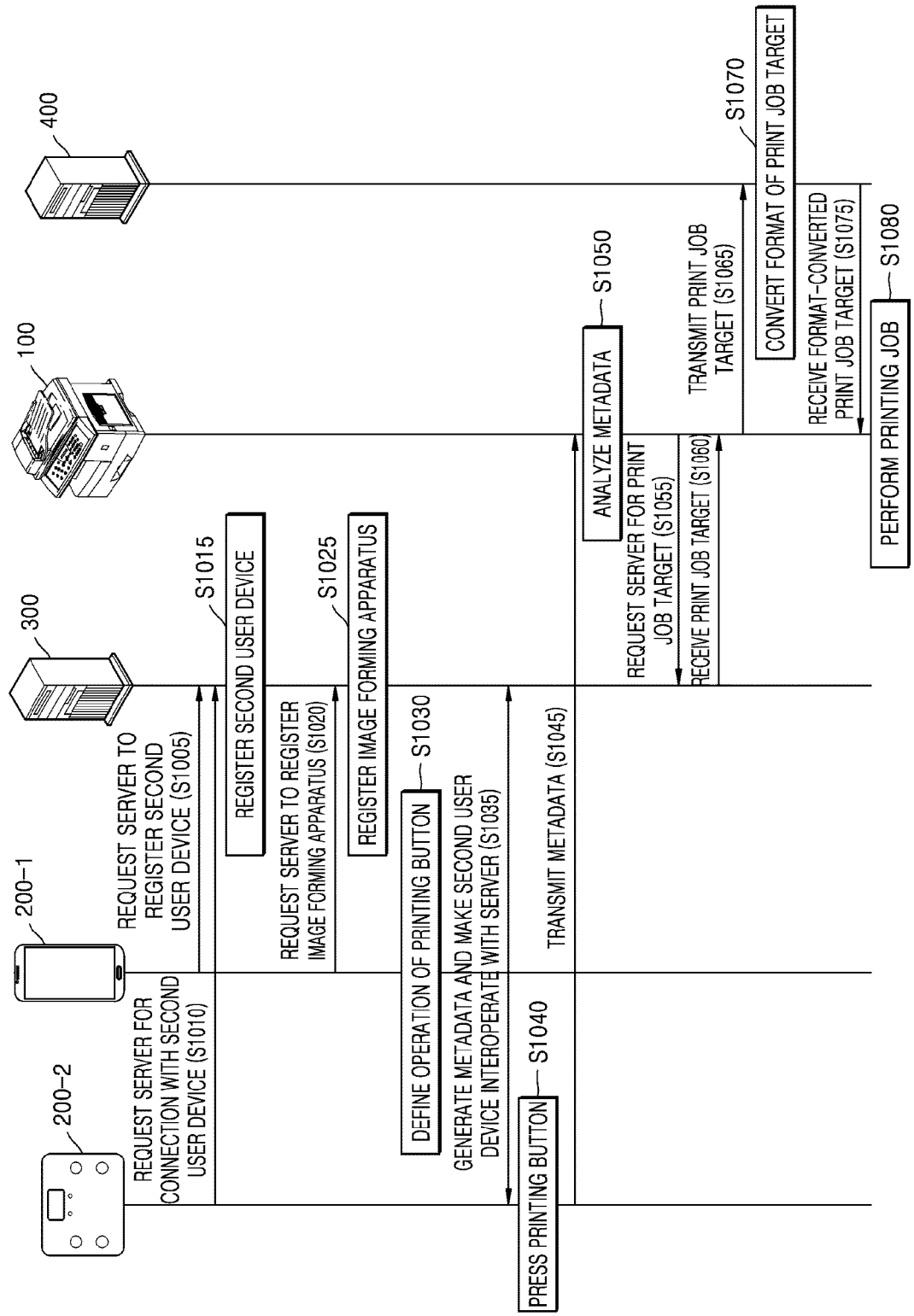

[Fig. 11]
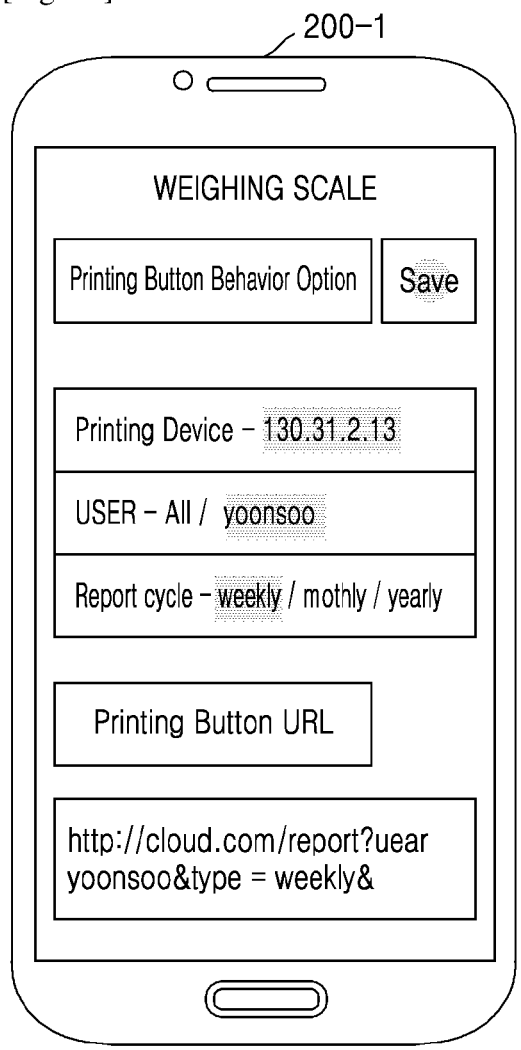

PERFORMING PRINT JOB ACCORDING TO FORMAT OF PRINT JOB ACQUIRED BASED ON METADATA

BACKGROUND ART

An image forming apparatus, such as a printer, a copier, a fax machine, a scanner, and a multi-functional printer, may be connected to various devices by using wired/wireless communication technology. When an image forming apparatus receives a document corresponding to a print job target from another apparatus, the image forming apparatus can receive a document converted into a format capable of being printed by the image forming apparatus from the other apparatus and may print the document.

DISCLOSURE OF INVENTION

Brief Description of Drawings

The above and other aspects, features, and advantages of certain examples of the disclosure will be more apparent from the following description taken in conjunction with the accompanying drawings, in which:

FIG. 1 is a schematic diagram for explaining a printing environment including an image forming apparatus, a user device, and a server, according to an example;

FIG. 2 is a block diagram for explaining respective structures and respective operations of an image forming apparatus, a user device, and a server, according to an example;

FIG. 3 is a schematic diagram for explaining operations between an image forming apparatus, a user device, a server, and an external conversion server, according to an example;

FIG. 4 is a schematic diagram for explaining metadata, according to an example;

FIG. 5 is a schematic diagram for explaining a user interface that is used by a user device to transmit metadata to an image forming apparatus, according to an example;

FIG. 6 is a schematic diagram for explaining a user interface that is used by a user device to transmit metadata to an image forming apparatus, according to another example;

FIG. 7 is a flowchart of a method, performed by an image forming apparatus, of performing a printing job according to a format of a print job target, according to an example;

FIGS. 8A, 8B, and 8C are views for explaining a user interface that is provided by an image forming apparatus, according to an example;

FIG. 9 is a schematic diagram for explaining a printing environment including an image forming apparatus, a first user device, a second user device, and a server, according to an example;

FIG. 10 is a schematic diagram for explaining a printing environment including an image forming apparatus, a first user device, a second user device, a server, and a conversion server, according to an example; and FIG. 11 is a view for explaining a user interface that is provided by a first user device that generates new metadata by defining an operation of a printing button provided in a second user device, according to an example.

Throughout the drawings, it should be noted that like reference numbers are used to depict the same or similar elements, features, parts, components, and structures and thus, a repeated description thereof may be omitted.

MODE FOR THE INVENTION

Various examples now will be described more fully hereinafter with reference to the accompanying drawings.

The examples described hereinafter may be modified in many different forms. To more clearly describe features of examples, matters well known to one of ordinary skill in the art to which the below examples pertain will not be described in detail.

In the specification, the term "image forming job" may denote any one of various jobs (for example, printing, copying, scanning, and faxing) related to an image, such as forming of an image or generating/storing/transmitting of an image file, and the term "job" may denote not only an image forming job, but may also denote a series of processes required to perform the image forming job.

The term "image forming apparatus" may denote any apparatus capable of performing an image forming job, such as a copier, a printer, a scanner, a fax machine, a multi-function printer (MFP), or a display apparatus.

The term "print data" may denote data having a format printable by a printer and the term "scan file" may denote a file generated by scanning an image by using a scanner.

Expressions such as "at least one of," when preceding a list of elements, modify the entire list of elements and do not modify the individual elements of the list.

FIG. 1 is a schematic diagram for explaining a printing environment including an image forming apparatus, a user device, and a server, according to an example.

Referring to FIG. 1, an image forming apparatus 100 may perform an image forming job. For example, the image forming apparatus 100 may form an image on a recording medium via any one of various printing methods, such as an electrophotography method, an inkjet method, a thermal transfer method, a thermal method, or the like. The user device 200 may be an electronic device, such as a smartphone, a smart watch, a notebook, a digital camera, or the like, or a home appliance product, such as a scale for determining a weight, an air conditioner, a washing machine, a television (TV), or the like. Thus, the term "user device" may be considered as a general term for a device capable of performing communication by being connected to another device via a network. A server 300 is a storage server that stores a print job target. In various examples, the server 300 may be any of various types of servers, such as a web server, a file server, a cloud server, or the like, according to services that are provided by the server 300. In response to a request from the image forming apparatus 100 or the user device 200, the server 300 may support a printing service by providing a response to the request.

In an example, the image forming apparatus 100, the user device 200, and the server 300 may perform communication with each other. A user may receive a service provided by the server 300 by using the user device 200 and may print an electronic document, a web page, or the like stored in the server 300 via the image forming apparatus 100. To this end, the user may transmit information about a print job target, such as the electronic document or the web page stored in the server 300, to the image forming apparatus 100. For example, when the user intends to output an electronic document provided by the server 300 while viewing the electronic document via the user device 200, the user may transmit information about a print job target, such as location information indicating a storage location of the electronic document, to the image forming apparatus 100 via the user device 200. The image forming apparatus 100 may receive a print job target such as the electronic document from the server 300, based on the information about the print job target, such as the location information indicating the storage location of the electronic document, received from the user device 200, and perform a printing job.

FIG. 2 is a block diagram for explaining respective structures and respective operations of an image forming apparatus, a user device, and a server, according to an example.

Referring to FIG. 2, an image forming apparatus 100 may include a user interface (UI) device 110, a controller 120, a communicator 130, a memory 140, and an image forming job performer 150. Although not shown in FIG. 2, the image forming apparatus 100 may further include a power supplier for supplying power to each component of the image forming apparatus 100.

The UI device 110 may include an input unit for receiving an input for performing an image forming job and an output unit for displaying information, such as a result of performing an image forming job or a state of the image forming apparatus 100.

The controller 120 may control an operation of the image forming apparatus 100 and may include at least one processor, such as a central processing unit (CPU). The controller 120 may control other components included in the image forming apparatus 100 such that an operation corresponding to a request received via the UI device 110 or the communicator 130 is performed. The controller 120 may include at least one specialized processor corresponding to each function, or may be an integrated processor. The controller 120 may execute a program stored in the memory 140, read data or files from the memory 140, or store a new file in the memory 140.

The communicator 130 may perform wired/wireless communication with another device or a network. To this end, the communicator 130 may include a communication module (e.g., a transceiver) that supports at least one of various wired or wireless communication methods. The wireless communication may be, for example, wireless fidelity (WiFi), WiFi Direct, Bluetooth, Bluetooth low energy (BLE), ultra wide band (UWB), near field communication (NFC), etc. The wired communication may be, for example, Ethernet, a universal serial bus (USB), a high definition multimedia interface (HDMI), etc. The communicator 130 may be connected to an external apparatus outside the image forming apparatus 100 to transmit or receive a signal or data to or from the external apparatus. The communicator 130 may receive a signal or data from the user device 200 or the server 300, or transmit a signal or data generated by the image forming apparatus 100 to the user device 200 or the server 300. The communicator 130 may be directly connected to the server 300 and may obtain a printing job target that is used in a printing job.

The memory 140 may install and store programs, such as applications, and various types of data, such as files. The controller 120 may access and use data stored in the memory 140 or may store new data in the memory 140. The controller 120 may execute a program installed in the memory 140. The controller 120 may install, in the memory 140, an application received from an external source through the communicator 130.

The image forming job performer 150 may perform an image forming job, such as printing, copying, scanning, or faxing. As illustrated in FIG. 2, the image forming job performer 150 includes a printing unit 151, a scanning unit 152, and a faxing unit 153. However, as occasion demands, the image forming job performer 150 may only include some of them or may further include a component for performing another type of image forming job.

A user device 200 may include a processor 210, a UI device 220, a communicator 230, and a memory 240.

The processor 210 may control an operation of the user device 200 and may include at least one processing unit, such as a CPU. The processor 210 may control the other components included in the user device 200 to perform an operation corresponding to a user input received via the UI device 220. The processor 210 may include at least one specialized processor corresponding to each function. The processor 210 may execute a program stored in the memory 240, read data or files from the memory 240, or store a new file in the memory 240.

The UI device 220 may include an input unit that obtains an input of a user and an output unit that provides information to the user. For example, the input unit may be an operation panel capable of receiving a user's manipulation, a microphone capable of obtaining a voice of the user, or the like. The output unit may be, for example, a display panel that displays an image, a speaker, or the like.

The user device 200 may be connected to an external device, such as the image forming apparatus 100 or the server 300, via the communicator 230. To this end, the communicator 230 (e.g., transceiver) may support at least one of WiFi, WiFi Direct, Bluetooth, BLE, UWB, NFC, third generation (3G), fourth generation (4G), fifth generation (5G), etc.

The memory 240 may store instructions executable by the processor 210. The memory 240 may install and store programs, such as applications, and various types of data, such as files.

The server 300 may include a memory 310, a processor 320, and a communicator 330. The memory 310 may store information associated with various services that are provided by the server 300, or information received from an external device. The processor 320 may control overall operations of the server 300 and may include at least one processing unit. The communicator 330 may include a communication module (e.g., a transceiver) corresponding to the communicator 130 of the image forming apparatus 100 or the communicator 230 of the user device 200 such that the communication module may communicate with the communicator 130 or the communicator 230.

In an example, the image forming apparatus 100 may perform a printing job according to a format of a print job target obtained by the server 300 based on metadata transmitted by the user device 200, as follows.

The processor 210 of the user device 200 may execute instructions stored in the memory 240 to generate metadata based on a user input received via the UI device 220. The metadata generated by the processor 210 may include location information of the print job target. The processor 210 may also control the communicator 230 to transmit the generated metadata to the image forming apparatus 100. The location information of the print job target may include a protocol and path information for accessing the print job target. When the protocol included in the metadata does not transmit format information of the print job target, the metadata may further include format information of the print job target.

According to execution of a printing application, the processor 210 of the user device 200 may receive a user input of selecting the image forming apparatus 100, to which the metadata is to be transmitted, via the UI device 220. The processor 210 of the user device 200 may also receive, via an interactive user interface, a user input regarding at least one piece of information that constitutes the metadata, and control the communicator 230 to transmit the received user input to the selected image forming apparatus 100.

The controller 120 of the image forming apparatus 100 may analyze the metadata received from the user device 200 via the communicator 130, obtain the print job target from the server 300 storing the print job target, based on the location information of the print job target included in the metadata, and control the image forming job performer 150 to perform a printing job according to the format of the obtained print job target. The controller 120 of the image forming apparatus 100 may determine a printing method according to the format of the obtained print job target and control the image forming job performer 150 to perform direct printing or web printing according to a result of the determination. When the format of the obtained print job target is a format for which the image forming apparatus 100 supports direct printing, the controller 120 of the image forming apparatus 100 may control the image forming job performer 150 to perform the direct printing with respect to the print job target. On the other hand, when the format of the obtained print job target does not support direct printing, the controller 120 of the image forming apparatus 100 may control the image forming job performer 150 to display the print job target on a web browser screen image and perform web printing.

When the format of the print job target is a format for which direct printing is not supported by the image forming apparatus 100 and is convertible into a format for which the image forming apparatus 100 supports the direct printing by an external conversion server, the controller 120 of the image forming apparatus 100 may transmit the print job target to the external conversion server and may control the communicator 130 to receive, from the external conversion server, a print job target having the format for which the image forming apparatus 100 supports the direct printing.

FIG. 3 is a schematic diagram for explaining operations between an image forming apparatus, a user device, a server, and an external conversion server, according to an example.

Referring to FIG. 3, a user may search for a print job target while using a service provided by the server 300 via the user device 200 in operation S305. For example, the user may access a web page operated by the server 300 via the user device 200 and may search for various pieces of information that are provided by the web page. The user may discover information desired to be printed from the web page and may check information about a print job target stored in the server 300.

In operation S310, the user may execute a printing application by using the user device 200. The user may execute the printing application provided in the user device 200 in order to print the print job target stored in the server 300. The user may search surrounding image forming apparatuses 100 via a user interface that is provided by the printing application executed by the user device 200 and may select an image forming apparatus 100 that is to perform a printing job.

In operation S315, the user may generate metadata by inputting information about the print job target via the user interface that is provided by the printing application executed by the user device 200. The metadata refers to a data structure not including content of the print job target but including information necessary for printing the print job target.

FIG. 4 is a schematic diagram for explaining metadata, according to an example.

Referring to FIG. 4, the metadata includes various types of pieces of information for a printing job, in each field. For example, the metadata may include a protocol, path information, authentication information, a Multipurpose Internet Mail Extensions (MIME) type, and printing options. The protocol refers to a protocol in which the image forming apparatus 100 is to access the server 300 storing the print job target, and the path information indicates a location where the print job target is stored in the server 300. The authentication information may be used when the server 300 needs user authentication to access the server 300 having the print job target stored therein. The MIME type refers to the format of the print job target, for example, text/html, application/pdf, etc. The printing options refer to printing option setting information that is to be applied to printing when the image forming apparatus 100 performs a printing job. For example, the metadata of FIG. 4 may include a Hypertext Transfer Protocol (HTTP) that is to be used when the image forming apparatus 100 accesses the server 300, and path information indicating the location where the print job target is stored, namely, "http://www.hp.com/content?a=b&c=d". The metadata may include a user name (e.g., "yoonsoo.lee") and a password (e.g., "*****") as the authentication information, in order to access the server 300 that needs user authentication. The MIME type of the print job target to be obtained from the server 300 is "text/html", and "Ncopy=1" may be applied as a printing option when the image forming apparatus 100** prints the print job target.

Referring back to FIG. 3, in operation S320, the user device 200 may transmit the generated metadata to the image forming apparatus 100.

FIG. 5 is a schematic diagram for explaining a user interface that is used by a user device to transmit metadata to an image forming apparatus, according to an example. FIG. 6 is a schematic diagram for explaining a user interface that is used by a user device to transmit metadata to an image forming apparatus, according to another example.

Referring to FIG. 5, a UI device 220 of the user device 200 may display various types of applications, such as a web browser application, a network file browser application, a printing application, or the like on a display screen. To achieve a printing job, the user may execute a printing application and search surrounding image forming apparatuses 100 to select an image forming apparatus 100 that is to perform a printing job. When the image forming apparatus 100 that is to perform a printing job is selected, the user may input at least one piece of information that constitutes metadata by using an interactive user interface. For example, location information of a print job target including a protocol and path information for accessing the print job target, a MIME type, and authentication information may be input. Based on a user input, the user device 200 may request printing by transmitting the metadata including the location information of the print job target to the image forming apparatus 100.

FIG. 6 illustrates an example in which, when the user searches for a web page provided by a web server by executing a web browser application and wants to print the web page, the user immediately brings location information of a print job target by making a printing application share the Uniform Resource Locator (URL) of the web page. Moreover, the user may fetch a UI screen image capable of inputting option setting or authentication information for printing, by pressing an option button previously provided in an interactive user interface.

Referring back to FIG. 3, in operation S325, the image forming apparatus 100 may analyze the metadata received from the user device 200. The image forming apparatus 100 may parse the metadata to separate and extract pieces of information stored in each field of the metadata. The image forming apparatus 100 may perform a preparation process for performing a printing job, based on the pieces of information stored in each field of the metadata. For example, the image forming apparatus 100 may ascertain a place where the print job target is stored, based on the location information of the print job target included in the metadata, and, when the protocol included in the metadata does not transmit the format information of the print job target, the image forming apparatus 100 may ascertain the format information of the print job target via the MIME type included in the metadata.

In operation S330, the image forming apparatus 100 may request the server 300, which stores print job targets, for a print job target, based on the location information of the print job target included in the metadata.

In operation S335, the image forming apparatus 100 may receive the print job target from the server 300, which stores print job targets.

In operation S340, when the image forming apparatus 100 may not perform direct printing with respect to the print job target received from the server 300, the image forming apparatus 100 may transmit the print job target to the conversion server 400 in order to convert the format of the print job target. In operation S345, the conversion server 400 may convert the format of the print job target into a format for which the image forming apparatus 100 supports direct printing. In operation S350, the image forming apparatus 100 may receive a format-converted print job target from the conversion server 400. Operations S340 through S350 for converting the format of the print job target are optional according to the formats of printing job targets.

In operation S355, the image forming apparatus 100 may perform a printing job according to the format of the print job target.

FIG. 7 is a flowchart of a method, performed by an image forming apparatus, of performing a printing job according to a format of a print job target, according to an example.

Referring to FIG. 7, the image forming apparatus 100 may determine whether the print job target received from the server 300 supports direct printing, by determining the format of the print job target in operation 705.

In operation 710, when the print job target supports direct printing, the image forming apparatus 100 may perform the direct printing. For example, when the format of the print job target is portable document format (PDF), joint photographic experts group (JPG), tagged image file format (TIFF), or text files (TXT), the image forming apparatus 100 may perform direct printing on the print job target.

In operation 715, when the format of the print job target is a format for which the image forming apparatus 100 does not support direct printing, the image forming apparatus 100 may determine whether the external conversion server 400 is able to convert the format of the print job target into the format for which the image forming apparatus 100 supports direct printing.

In operation 720, when the format of the print job target is a format for which the image forming apparatus 100 does not support direct printing, and the external conversion server 400 is able to convert the format of the print job target into the format for which the image forming apparatus 100 supports the direct printing, the image forming apparatus 100 may transmit the print job target to the conversion server 400 and receive a print job target of which the format has been converted into the format for which direct printing is supported, to thereby perform the direct printing.

In operation 725, when the format of the print job target is the format for which the image forming apparatus 100 does not support direct printing and the external conversion server 400 is unable to perform format conversion, the image forming apparatus 100 may determine whether web printing on the print job target is supported.

In operation 730, when the image forming apparatus 100 is not able to perform direct printing on the print job target but is able to perform web printing on the print job target, the image forming apparatus 100 may display the print job target on a web browser screen image and perform web printing.

In operation 735, the image forming apparatus 100 may output printed matter corresponding to the print job target by performing the direct printing or the web printing. On the other hand, although not shown, when the format of the print job target is a format that the image forming apparatus 100 is unable to print, the image forming apparatus 100 may output a message window indicating that printing is not possible, and terminate a printing job.

FIGS. 8A, 8B, and 8C are views for explaining a user interface that is provided by an image forming apparatus, according to an example.

As described above, the image forming apparatus 100 may analyze the metadata received from the user device 200 and determine format information and a protocol of the print job target included in the metadata to thereby prepare for a printing job. However, when the format or protocol of the print job target included in the metadata is not supported by the image forming apparatus 100, the image forming apparatus 100 may not obtain the print job target by accessing the server 300, or may not perform a printing job on an obtained print job target. Accordingly, to expand formats in which direct printing is possible or expand protocols accessible to the server 300, the image forming apparatus 100 may provide a user interface that adds a format or protocol not supported by the image forming apparatus 100.

Referring to FIG. 8A, a user interface is illustrated that is provided by the UI device 110 of the image forming apparatus 100 and adds a format not supported by the image forming apparatus 100.

Referring to FIG. 8B, a user interface is illustrated that is provided by the UI device 110 of the image forming apparatus 100 and adds a protocol not supported by the image forming apparatus 100. The image forming apparatus 100 may update data associated with the added format or protocol via a management server that is operated by a printing service provider.

Referring to FIG. 8C, a user interface is illustrated on which, when the format of the print job target is a format for which the image forming apparatus 100 does not support direct printing, a list of conversion servers 400 is displayed according to the types of formats into which the conversion servers 400 may convert the format of a print job target. One of the listed conversion servers 400 may be selected so that the image forming apparatus 100 may transmit the print job target according to the type of format into which the conversion server 400 converts the format of the print job target. For example, when a print job target of Hangul word processor (HWP) document type is received by the image forming apparatus 100, the image forming apparatus 100 may select a conversion server 1 and transmit the print job target of the HWP document type to the conversion server 1. In response, the image forming apparatus 100 may receive a print job target having a PDF format instead of an HWP format from the conversion server 1.

FIG. 9 is a schematic diagram for explaining a printing environment including an image forming apparatus, a first user device, a second user device, and a server, according to an example.

Referring to FIG. 9, a printing environment may include a first user device 200-1 and a second user device 200-2. The first user device 200-1 and the second user device 200-2 may communicate with the image forming apparatus 100 or the server 300, similar to the user device 200 of FIG. 1.

The second user device 200-2 may refer to a device having a restriction on the use of a user interface for a user input or having a low level of user interface environment, compared with the first user device 200-1. For example, the first user device 200-1 may be a device for which a user interface for a user input is easy to use, such as a smartphone, and the second user device 200-2 may be a device having a restriction on the use of a user interface for a user input, such as a scale to determine a weight. The second user device 200-2, such as a scale, may include a user interface or a physical button for a user input, but the level of a user interface environment (e.g., sophistication, convenience, etc.) of the second user device 200-2 is lower than that of a user interface environment of the first user device 200-1. Thus, the included user interface or physical button of the second user device 200-2 is able to perform only a restricted user input, and accordingly there is a limit in user inputs. Therefore, the user may perform, for example, an operation definition of the second user device 200-2 or settings regarding the second user device 200-2, via the UI device 220 of the first user device 200-1, by connecting the first user device 200-1 to the second user device 200-2 via communication (e.g., wireless communication).

Referring to FIG. 9, the first user device 200-1 and the second user device 200-2 may be connected to each other via wired or wireless communication. As illustrated in FIG. 9, the second user device 200-2 has a low level of a user interface environment for a user input, and thus the user may be unable to perform various types of user inputs. FIG. 9 illustrates a case where the second user device 200-2 is a scale. The second user device 200-2 may include a software button or hardware button for performing a very limited user input, such as a button for manipulating a liquid crystal display (LCD) screen and a menu or a button for performing a specific function. In such a user interface environment of the second user device 200-2, a user input regarding at least one piece of information that constitutes metadata is difficult. When the user tries to perform a printing job associated with the second user device 200-2, because the second user device 200-2 is very limited in terms of a user input, the user may expand the user interface environment by connecting the first user device 200-1 to the second user device 200-2. The user may perform a control operation or a setting input of the second user device 200-2 via the UI device 220 of the first user device 200-1 connected to the second user device 200-2. The software button or the hardware button included in the second user device 200-2 may perform only a specific function.

Example operations between the image forming apparatus 100, the first user device 200-1 being a smartphone, the second user device 200-2 being a scale, and the server 300 storing data transmitted by the scale will be described with reference to FIG. 9.

When the user measures his or her weight for a certain period of time by using the second user device 200-2 that is implemented as a scale, the scale may transmit the measured weight to the server 300 interoperating with the scale. In an example, the server 300 may store and manage weight statistics of the user. When the user wants to output the weight statistics as printed matter in order to determine his or her weight change during a certain period of time, the user may request the image forming apparatus 100 to print out the weight statistics, by pressing the software button or the hardware button included in the scale. The image forming apparatus 100 may access the server 300 according to a printing request from the scale to thereby receive the weight statistics of the user from the server 300 and perform a printing job. For such a series of operations, prior actions, such as an interoperation between the second user device 200-2, being a scale, and the server 300 and a definition of an operation of the software button or the hardware button included in the second user device 200-2, need to be taken. Because the second user device 200-2 has a restriction on a user input as described above, the user may connect the second user device 200-2 to the first user device 200-1 and may take the prior actions via the first user device 200-1.

FIG. 10 is a schematic diagram for explaining a printing environment including an image forming apparatus, a first user device, a second user device, a server, and a conversion server, according to an example.

Referring to FIG. 10, a case in which the first user device 200-1 is a smartphone and the second user device 200-2 is a scale, and the second user device 200-2 is unable to achieve a user input for generating metadata is illustrated.

In operation S1005, the first user device 200-1 may request the server 300 to register the second user device 200-2.

In operation S1010, the second user device 200-2 may request the server 300 for a connection with the second user device 200-2.

In operation S1015, the server 300 may register the second user device 200-2.

In operation S1020, the first user device 200-1 may request the server 300 to register the image forming apparatus 100.

In operation S1025, the server 300 may register the image forming apparatus 100.

In operation S1030, the first user device 200-1 may define an operation of a printing button (software button or hardware button) provided in the second user device 200-2. For example, when the software button or the hardware button provided in the second user device 200-2 is pressed, the first user device 200-1 may determine which information included in metadata the second user device 200-2 is to transmit to the image forming apparatus 100.

In operation S1035, when the first user device 200-1 presses the printing button provided in the second user device 200-2, the first user device 200-1 may generate metadata that is to be transmitted to the image forming apparatus 100 and may make the second user device 200-2 interoperate with the server 300. The metadata that is to be transmitted to the image forming apparatus 100 may be newly generated as an operation of the printing button provided in the second user device 200-2 is defined.

FIG. 11 is a view for explaining a user interface that is provided by a first user device that generates new metadata by defining an operation of a printing button provided in a second user device, according to an example.

Referring to FIG. 11, a user interface is illustrated that defines that, when the printing button provided in the second user device 200-2, being a scale, is pressed, metadata including information about a location where the weight statistics of a user "yoonsoo" regarding a weekly weight are stored is transmitted to an image forming apparatus "130.31.2.13". Because the defining of the operation of the printing button provided in the second user device 200-2 is associated with determination of location information of a print job target, the defining may affect metadata generation. As the structure of a web page provided by the server 300 receiving information obtained by the second user device 200-2 is changed, metadata having changed location information of the print job target may be generated and transmitted to the second user device 200-2.

Referring back to FIG. 10, in operation S1040, the user may press the printing button provided in the second user device 200-2.

In operation S1045, when the user presses the printing button provided in the second user device 200-2, the metadata received via the first user device 200-1 may be transmitted to the image forming apparatus 100.

Operations 51050 through 51080 are the same as operations S325 through S355 of FIG. 3, and thus descriptions thereof will be omitted.

The above-described examples may be embodied in the form of a non-transitory computer-readable recording medium storing computer-executable instructions or data.

The above-described examples can be written as computer programs and can be implemented in general-use digital computers that execute the programs using a computer-readable recording medium. Examples of the non-transitory computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer executes the instruction.

While the disclosure has been shown and described with reference to examples thereof, it will be understood by those of ordinary skill in the art that various changes in form and details may be made therein without departing from the spirit and scope of the disclosure as defined by the following claims. In an example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

The invention claimed is:

1. A user device comprising:
a user interface device;
a communicator;
a processor; and
a memory storing instructions executable by the processor,
wherein the processor executes the instructions to:
generate metadata including location information of a print job target, based on a user input made via the user interface device,
control the communicator to transmit the generated metadata to an image forming apparatus,
request a server to register a second user device that is unable to perform the user input for generating the metadata and the image forming apparatus to which the second user device is to transmit the metadata,
generate the metadata by defining an operation of a software button or hardware button provided in the second user device and make the second user device interoperate with the server, and as a structure of a web page provided by the server receiving information obtained by the second user device is changed, generate metadata having changed location information of the print job target and control the communicator to transmit the generated metadata to the second user device.

2. The user device of claim 1, wherein
the location information of the print job target comprises a protocol and path information for accessing the print job target, and
when the protocol included in the metadata does not transmit format information of the print job target, the metadata further comprises format information of the print job target.

3. The user device of claim 1, wherein, according to execution of a printing application, the processor:
receives a user input of selecting the image forming apparatus, to which the metadata is to be transmitted, via the user interface device,
receives, via an interactive user interface, a user input regarding at least one piece of information that constitutes the metadata, and
controls the communicator to transmit the received user input to the selected image forming apparatus.

4. The user device of claim 1, wherein the metadata transmitted to the second user device is transmitted to the image forming apparatus as the software button or the hardware button provided on the second user device is pressed.

5. A non-transitory computer-readable storage medium storing instructions executable by a processor, the non-transitory computer-readable storage medium comprising:
instructions to generate metadata comprising location information of a print job target, based on a user input made via a user interface device;
instructions to control a communicator to transmit the generated metadata to an image forming apparatus;
instructions to request a server to register a second user device that is unable to perform the user input for generating the metadata and the image forming apparatus to which the second user device is to transmit the metadata;
instructions to generate the metadata by defining an operation of a software button or hardware button provided in the second user device and make the second user device interoperate with the server; and
as a structure of a web page provided by the server receiving information obtained by the second user device is changed, instructions to generate metadata having changed location information of the print job target and control the communicator to transmit the generated metadata to the second user device.

6. A user device comprising:
a user interface device;
a communicator;
a processor; and
a memory storing instructions executable by the processor,
wherein the processor executes the instructions to:
generate metadata including location information of a print job target, based on a user input made via the user interface device,
control the communicator to transmit the generated metadata to an image forming apparatus, and
request a server to register a second user device that is unable to perform the user input for generating the metadata and the image forming apparatus to which the second user device is to transmit the metadata.

7. The user device of claim 6, wherein
the location information of the print job target comprises a protocol and path information for accessing the print job target, and
when the protocol included in the metadata does not transmit format information of the print job target, the metadata further comprises format information of the print job target.

8. The user device of claim 6, wherein, according to execution of a printing application, the processor:
receives a user input of selecting the image forming apparatus, to which the metadata is to be transmitted, via the user interface device,
receives, via an interactive user interface, a user input regarding at least one piece of information that constitutes the metadata, and
controls the communicator to transmit the received user input to the selected image forming apparatus.

9. The user device of claim 6, wherein the memory stores further instructions that are executable by the processor to generate the metadata by defining an operation of a software button or hardware button provided in the second user device and make the second user device interoperate with the server.

10. The user device of claim 9, wherein, as a structure of a web page provided by the server receiving information obtained by the second user device is changed, the memory stores further instructions that are executable by the processor to generate metadata having changed location information of the print job target and control the communicator to transmit the generated metadata to the second user device.

11. The user device of claim 10, wherein the metadata transmitted to the second user device is transmitted to the image forming apparatus as the software button or the hardware button provided on the second user device is pressed.

12. A non-transitory computer-readable storage medium storing instructions executable by a processor, the non-transitory computer-readable storage medium comprising:
instructions to generate metadata comprising location information of a print job target, based on a user input made via a user interface device;
instructions to control a communicator to transmit the generated metadata to an image forming apparatus; and
instructions to request a server to register a second user device that is unable to perform the user input for generating the metadata and the image forming apparatus to which the second user device is to transmit the metadata.

\* \* \* \* \*